Patented Oct. 29, 1940

2,220,044

UNITED STATES PATENT OFFICE 2,220,044

SEPARATION OF MALEIC AND PHTHALIC ANHYDRIDES

Alphons O. Jaeger, Greenwich, Conn., assignor to American Cyanamid & Chemical Corporation, New York, N. Y., a corporation of Delaware No Drawing. Application September 6, 1939, Serial No. 293,619

3 Claims. (Cl. 260—537)

This invention relates to the production and recovery of maleic acid or anhydride from the catalytic oxidation of organic compounds in which maleic anhydride is obtained as a by-product.

In the catalytic vapor phase oxidation of naphthalene to phthalic anhydride, a greater or less amount of maleic anhydride is produced as a by-product and if the naphthalene is admixed with phenols, wood tar, benzoic acid, benzene, furfural, thiophene, terpenes, cyclopentadiene or other compounds containing unsaturated linkages, larger amounts of maleic anhydride are produced. Similarly, if the naphthalene is omitted, maleic anhydride is produced as one of the products although in somewhat smaller yields.

In the gases coming from the vapor phase converter, the maleic acid, of course, is present mainly in the form of the anhydride which is a very volatile substance and cannot normally be condensed completely by cooling in the ordinary type of condenser, due to the presence of large volumes of diluting gases. It is necessary, therefore, to provide a liquid absorption system, organic or inorganic, usually employing a solution of maleic acid in water as an absorbing medium as described and claimed in the patent to Jaeger and Jewett, No. 2,098,047 dated November 2, 1937. In the past the maleic anhydride present in the converter gases, particularly in the case of the vapor phase oxidation of naphthalene to form phthalic anhydride as a primary product, has been only incompletely recovered because of the fact that a certain proportion of the maleic anhydride condenses with the phthalic anhydride before reaching the liquid absorption system. In the case of plants particularly designed for production of phthalic anhydride, this loss of the maleic anhydride present may amount to as much as 50%. Since maleic acid and maleic anhydride demand a higher price than does phthalic anhydride and the demand for maleic anhydried and acid is constantly increasing, this loss is a serious economic factor and it is the object of the present invention to reduce this loss.

According to the present invention, converter gases from the vapor phase catalytic oxidation of organic compounds, particularly converter gases which contain maleic anhydride in addition to other compounds such as phthalic anhydride, are passed through a condensing system followed by a liquid scrubbing system, but instead of cooling the condensers externally to as low a temperature as possible, they are maintained at a temperature sufficiently high so that maleic anhydride remains volatile. In this manner, maleic anhydride is prevented from condensing in solid form and is recovered more or less completely by the liquid scrubbing system. While any desired method of maintaining the temperature in the condensers above the condensing point of maleic anhydride can be used, I have found that at least for the cooler portions of the condenser, it is preferable to inject hot air which still further dilutes the gas stream and permits maintaining the maleic anhydride in the vapor state at temperatures which are lower than those necessary if no dilution had taken place. The curves of volatility of maleic anhydride and phthalic anhydride are such that a better separation is obtained and hot air is a cheaper and, from an operating standpoint, simpler method of obtaining the desired results. The dilution of the gases does not materially hinder the completeness with which the liquid scrubbing system removes maleic anhydride from the gases because an effective scrubbing system, such as for example the standard system described in the Jaeger and Jewett patent above referred to, will remove very efficiently the maleic anhydride from large volumes of diluting gases.

The best point at which the hot air should be injected will in general vary with the nature of the converter gases and also with the physical design of the condensing system. In cases where the converter gases are obtained from the catalytic oxidation of vapors, the first sections of the condenser are at a sufficiently elevated temperature so that it is not necessary to inject hot air into them, the injection therefore takes place further back in the series of condensers. The temperature at which the air is injected should be maintained below the point at which it will raise the temperature of the gases too high to permit effective condensation of the phthalic anhydride.

While the use of the present invention in conjunction with converter gases from the catalytic oxidation of naphthalene results in a small loss in phthalic anhydride, it is an advantage of the invention that this loss is kept low and is normally above the point in the condenser where the grade of phthalic anhydride produced is relatively low. Of course, small losses of phthalic anhydride are not serious economically because of the lower price which phthalic anhydride commands and in addition, the phthalic anhydride is not really lost as it is dissolved in the aqueous solution in the absorbing portion of the system and is removed in the process of purification of the maleic acid liquor produced. It is true that the phthalic acid is obtained from such processes in the form of the acid and sometimes in a form which is not very pure, but it is not entirely lost and can be used for many purposes, such as for example, the production of esters. It is an advantage of the present invention that the greatly improved recovery of maleic acid is obtained with but little loss of phthalic anhydride.

The invention will be described in greater detail in conjunction with a specific example which deals with a converter gas from a particular type of phthalic anhydride plant. It should be understood, of course, that this is merely an illustration and that the temperature and volume of the gas employed will necessarily vary with converter gases from different oxidations. Accordingly, the invention is not completely limited to the specific details set forth in the example.

*Example*

In the particular plant with which this example is concerned, about 4,000 lbs. of phthalic anhydride are produced daily and approximately 4,070 lbs. of naphthalene are consumed. 3460 lbs. of the naphthalene are converted into phthalic anhydride and the balance, or 610 lbs., is converted to other products, the major one being maleic anhydride.

The converter gases are passed through a condensing system where partial or complete condensation of the phthalic anhydride takes place along with some of the maleic anhydride, depending upon the rate of the gas cooling and the condenser wall temperatures.

The condenser system of this particular plant is composed of a series of three round condensers with rotary scrapers and a fourth box type condenser which is merely a large metal box with baffles and an opening into a fume tower. The condensers have a relatively large surface area to prevent loss of phthalic anhydride through the fume tower especially during hot summer weather. Some of the maleic anhydride passes through the condensers and it is recovered from the fume tower gases by the process of the Jaeger and Jewett patent mentioned heretofore. During the winter months the wall temperatures of the condensers drop to a considerable extent which causes a greater condensation of phthalic anhydride in the first condenser and also increases the amount of maleic anhydride that condenses into the condensers, contaminating the phthalic anhydride and also resulting in a decrease of the maleic acid recovered in the fume tower.

The following table shows the distribution of maleic acid in the condensers which is not recoverable from the fume tower gases under mean summer conditions and mean winter conditions.

| | Mean summer, percent maleic acid | Mean winter percent maleic acid |
|---|---|---|
| First condenser | 0.4 | 0.7 |
| Second condenser | 0.8 | 3.0 |
| Third condenser | 4.0 | 12.0 |
| Box condenser | 10.0 | 35.0 |
| Total not recoverable in the fume tower | 15.2 | 50.7 |

An examination of the table shows that there is a loss of only 15.2% of maleic acid by condensation which indicates a recovery of 84.8% under average summer conditions, whereas there is a loss of 50.7% and only a recovery of 49.3% under winter conditions. The table also shows that the condensation of maleic acid in the first condenser varies very little between summer and winter conditions but increases rapidly in the other condensers under winter conditions.

When approximately 620 cubic feet per minute of hot air at the temperature of 130–170° C. are introduced into the inlet of the second condenser and correspondingly smaller amounts into the inlet of the third condenser and the box condenser, conditions simulating those of summer are obtained and the maleic anhydride vapors are carried forward into the fume tower where they are readily recovered in quantities representing 85–90% of the total quantity produced by the process.

What I claim is:
1. A method of increasing the recovery of maleic acid from converter gases from the catalytic vapor phase oxidation of organic compounds which contain maleic anhydride, which comprises passing the gases through a series of condensers at progressively decreasing temperatures, followed by an absorbing system in which maleic acid is scrubbed out of the gases by an aqueous solution, injecting hot permanent gases substantially inert to maleic anhydride at the temperature of the condensers into the condensers to maintain the temperature in all of the condensers at a point above that at which substantial quantities of maleic anhydride are condensed under the partial pressure of maleic anhydride existing in the gas in question, whereby the maleic anhydride which would otherwise condense is carried forward in the vapor phase into the liquid absorbing system and there dissolved as maleic acid.

2. A process according to claim 1 in which the vapor phase oxidation is a catalytic vapor phase oxidation of naphthalene to phthalic anhydride.

3. A process according to claim 1 in which the aqueous solution in the absorbing system is an aqueous solution of maleic acid.

ALPHONS O. JAEGER.